(12) United States Patent
Morley et al.

(10) Patent No.: US 6,584,544 B1
(45) Date of Patent: Jun. 24, 2003

(54) METHOD AND APPARATUS FOR PREPARING A DISK FOR USE IN A DISK ARRAY

(75) Inventors: Steve Morley, Upton, MA (US); Bruce Harmon, Northboro, MA (US); Don Hon, Fuquay Varina, NC (US)

(73) Assignee: EMC Corporation, Hopkinton, MA (US)

(*) Notice: Subject to any disclaimer, the term of this patent is extended or adjusted under 35 U.S.C. 154(b) by 544 days.

(21) Appl. No.: 09/614,820

(22) Filed: Jul. 12, 2000

(51) Int. Cl.[7] .......................... G06F 12/00; G06F 13/00
(52) U.S. Cl. .......................... 711/114; 711/170; 714/45
(58) Field of Search .................... 711/114, 170–173; 713/1, 2, 100; 714/6, 7, 15, 21, 45

(56) References Cited

U.S. PATENT DOCUMENTS

| | | | | |
|---|---|---|---|---|
| 5,305,326 A | * | 4/1994 | Solomon et al. | 714/6 |
| 5,504,858 A | * | 4/1996 | Ellis et al. | 714/6 |
| 5,568,629 A | * | 10/1996 | Gentry et al. | 711/114 |
| 5,889,934 A | * | 3/1999 | Peterson | 714/6 |
| 6,502,174 B1 | * | 12/2002 | Beardsley et al. | 711/170 |

* cited by examiner

Primary Examiner—Reginald G. Bragdon
Assistant Examiner—Pierre M. Vital
(74) Attorney, Agent, or Firm—Bromberg & Sunstein LLP

(57) ABSTRACT

An apparatus and method for preparing a disk for use in a disk array, the disk array including an input/output control processor, the disk including sectors, the sectors including a data area and a metadata area, the method comprising defining a range of sectors to prepare for use in the disk array, sending a command to the disk from the input/output control processor, the command instructing the disk to write a block of initial state data to each sector in a group of sectors on the disk, the group of sectors on the disk located within the range of sectors on the disk, and writing the block of initial state data to each of the sectors on the disk. The block of initial state data comprises a bit stream of data for writing to the data area and the metadata area of each sector.

50 Claims, 2 Drawing Sheets

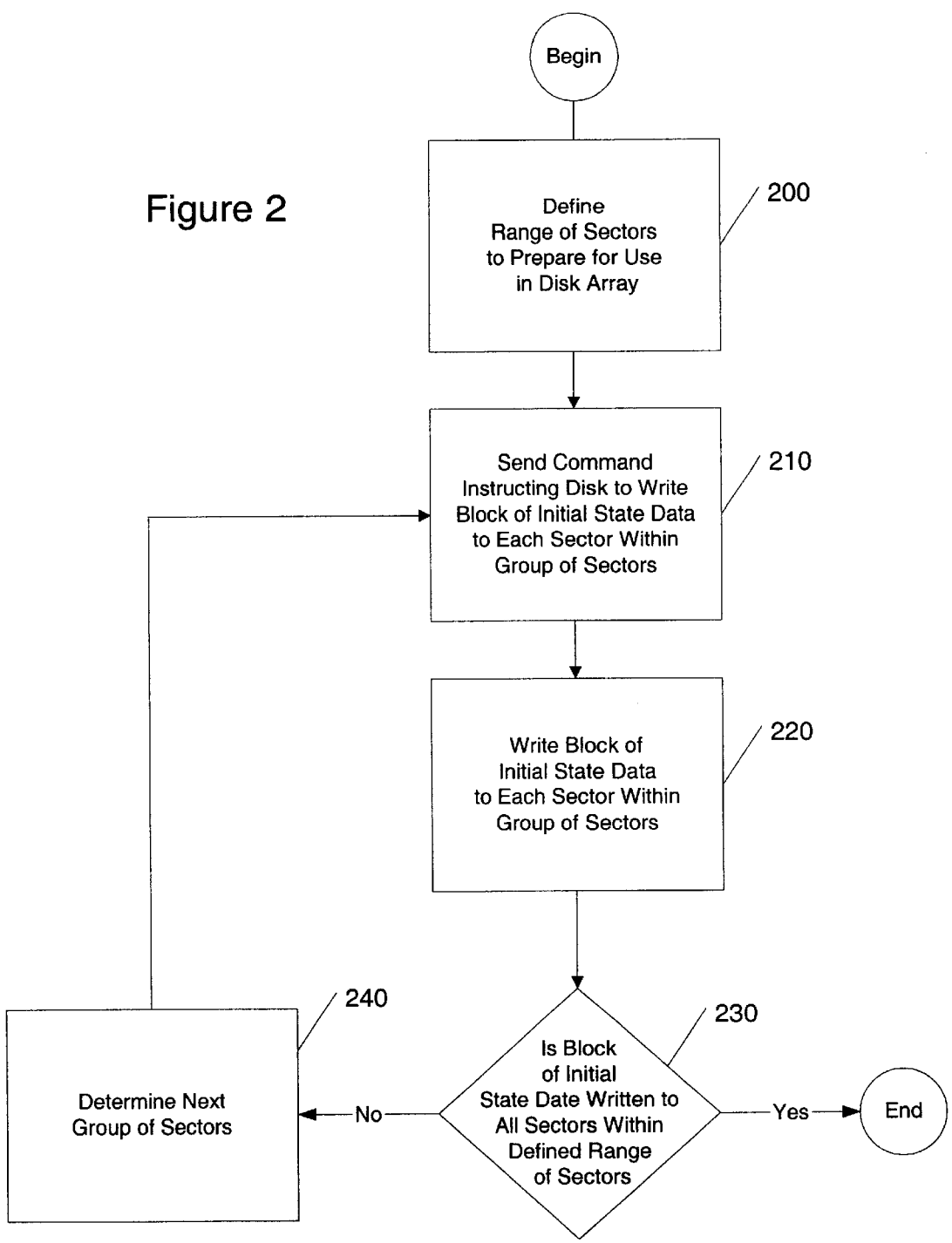

METHOD AND APPARATUS FOR PREPARING A DISK FOR USE IN A DISK ARRAY

FIELD OF THE INVENTION

The invention generally relates to disk arrays and, more particularly, the invention relates to the preparation of disks for use in disk arrays.

BACKGROUND OF THE INVENTION

A disk array is a cluster of disks controlled via an input/output control processor. To a computer system accessing the disk array, the disk array appears as a single disk drive. In general, a disk array having a particular capacity is more reliable and provides better performance than a large single disk drive of similar capacity.

A disk is a medium on which data can be recorded. For example, the data may be recorded using magnetic read/write heads or the data may be recorded using laser beams. Before data can be recorded on a disk, however, the disk must be formatted. In general, disk formatting defines the tracks and sectors on the disk. Typically, tracks are concentric circles around the disk and sectors are segments within each concentric circle.

After formatting, a disk is then prepared for use in a disk array. The preparation includes writing "initial state" data into each sector on the disk or into each sector in a range of sectors on the disk. When writing initial state data into a particular sector on the disk, the input/output control processor sends a command to the disk, across a channel connecting the processor to the disk, instructing the disk to write the initial state data into the particular sector on the disk. Thus, in preparing a disk for use in a disk array, the input/output control processor must send the command to write data (along with the data to be written) across the channel for each sector on the disk or for each sector in a range of sectors on the disk. As a result, the process for preparing a disk for use in a disk array can take hours to perform, especially when preparing a large number of disks for use in a disk array.

For example, in preparing a disk array for shipment to the customer, the multiple disks in the disk array are prepared at substantially the same time, using, for example, parallel write commands sent over the channel. Yet, it still takes more than 9 hours to prepare the disks in a medium-sized disk array, for example, a disk array containing 20–9 gigabyte disks and 20–18 gigabyte disks, for use in the disk array. Moreover, when preparing a disk for use in a disk array, the initial state data written into each sector on the disk or into each sector in a range of sectors on the disk must be consistent with the initial state data written into each sector on the other disks in the disk array or into each sector in a range of sectors on the other disks in the disk array. For example, initial state data for sectors that will contain parity data calculated for a selection of user data must be consistent with the initial state data for the sectors containing the user data.

SUMMARY OF THE INVENTION

In accordance with one aspect of the invention, a method and apparatus for preparing a disk for use in a disk array includes an input/output control processor and a disk having sectors, the sectors including a data area and a metadata area. First, the method and apparatus defines a range of sectors to prepare for use in the disk array. Then, the method and apparatus sends a command and a block of initial state data to the disk from the input/output control processor. The command instructs the disk to write the block of initial state data to each sector in a group of sectors on the disk. The group of sectors on the disk is located within the defined range of sectors on the disk. The block of initial state data is comprised of a bit stream of data for writing to the data area and the metadata area of each sector. Last, the method and apparatus writes the block of initial state data to each of the sectors in the group of sectors on the disk.

In a further embodiment of the invention, the method and apparatus determines that the block of initial state data has not been written to all of the sectors within the defined range of sectors on the disk. In this embodiment, the method and apparatus then sends another command to the disk to write the block of initial state data to at least one of the unprepared sectors within the defined range of sectors. Last, the method and apparatus writes the block of initial state data to the at least one unprepared sector.

In accordance with another aspect of the invention, a method and apparatus for preparing more than one disk for use in a disk array includes an input/output control processor and disks having sectors, the sectors including a data area and a metadata area. First, the method and apparatus defines for each disk a range of sectors to prepare for use in the disk array. Then, the method and apparatus sends a command and a block of initial state data to each of the disks from the input/output control processor. The command instructs each disk to write the block of initial state data to each sector in a group of sectors on the disk. The group of sectors on each disk is located within the defined range of sectors for the disk. The block of initial state data is comprised of a bit stream of data for writing to the data area and the metadata area of each sector. Last, the method and apparatus writes the block of initial state data for each disk to each sector in the group of sectors on the disk.

In a further embodiment of the invention, the method and apparatus determines that the block of initial state data has not been written to all of the sectors within the defined range of sectors on at least one disk. In this embodiment, the method and apparatus then sends another command to the at least one disk to write the block of initial state data for the at least one disk to at least one of the unprepared, that is, unwritten, sectors within the defined range of sectors. Last, the method and apparatus writes the block of initial state data to the at least one unprepared sector.

In a still further embodiment of the invention, the block of initial state data for each disk is the same block of initial state data. Or, in an alternative embodiment, the block of initial state data for at least one disk is different from the block of initial state data for the other disks.

In a further embodiment of both aspects of the invention, the method and apparatus also marks the prepared disk, or at least one of the prepared disks, with a signature. The signature signals to the input/output control processor that the disk is prepared for use in a disk array.

In alternate embodiments of both aspects of the invention, the metadata area may include a checksum area, a time stamp area, a write stamp area, or a shed stamp area. In addition, the block of initial state data may include a bit stream of zeros for writing to the data area, or a bit stream of zeros and ones for writing to the checksum area, or a bit stream of ones for writing to the time stamp area, or a bit stream of zeros for writing to the write stamp area, or a bit stream of zeros for writing to the shed stamp area.

In further alternate embodiments of both aspects of the invention, the sectors on the disk may be 520 bytes in length, the data area of the sectors may be 512 bytes in length, and the metadata area of the sectors may be 8 bytes in length. In addition, the command being sent may include the Small Computer System Interface Write Same command. Also, the disk array may be configured as a Redundant Array of Independent Disks.

In still further alternate embodiments to both aspects of the inventions, the group of sectors on the disk may be the same as the defined range of sectors on the disk. In addition, the defined range of sectors on the disk may include all of the sectors on the disk.

BRIEF DESCRIPTION OF THE DRAWINGS

The foregoing and other objects and advantages of the invention will be appreciated more fully from the following further description thereof with reference to the accompanying drawings wherein:

FIG. 2 shows another exemplary process for preparing a disk for use in a disk array.

DETAILED DESCRIPTION OF THE INVENTION

Figure 1:
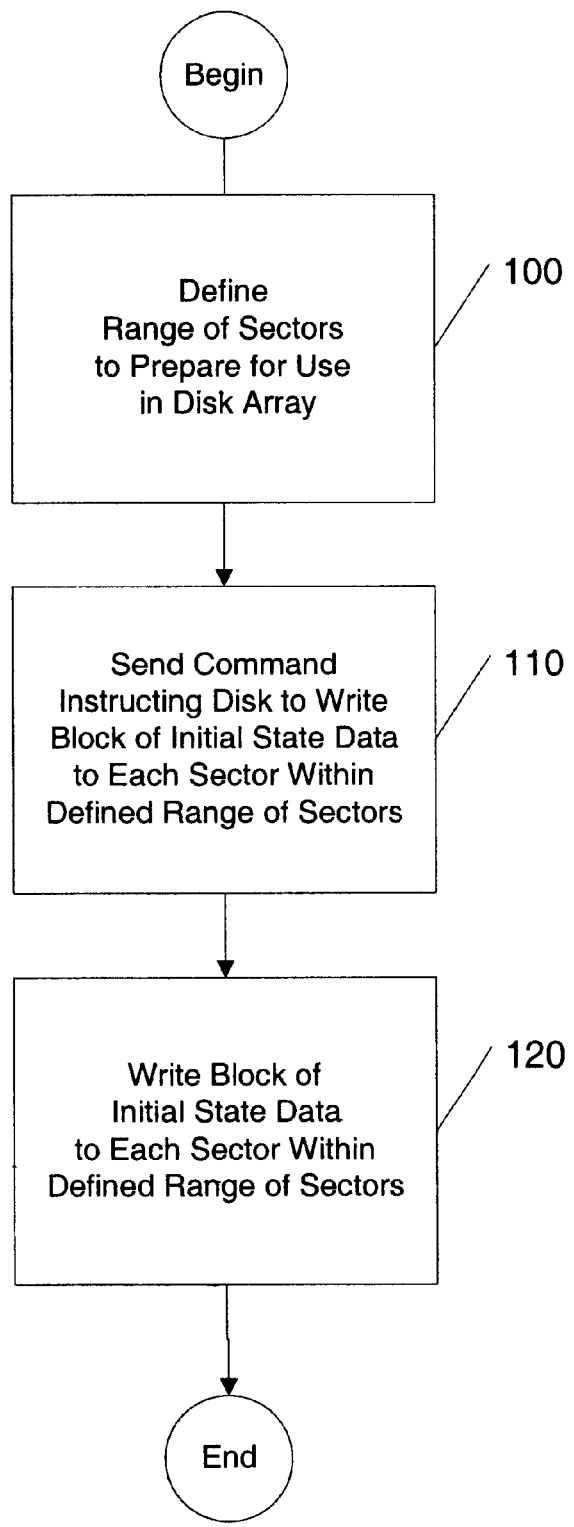
FIG. 1 shows an exemplary process for preparing a disk for use in a disk array.

In general, a disk array includes a cluster of disks connected to an input/output control processor via one or more channels. In turn, the input/output control processor is connected to a host processor via one or more input/output channels. Typically, the input/output control processor shields the host processor from the specifics of managing the disk array. In other words, the host processor requests blocks of user data to be read from the disk array, or written to the disk array, and the input/output control processor manages the process of reading the user data from the disk array, or writing the user data to the disk array.

Before being used in the disk array, however, the sectors on the disks in the disk array must be set to a consistent initial state. This process, referred to herein as preparation, may occur in a manufacturing setting (e.g., prior to shipment of a disk array to a customer) or at a customer site (e.g., when a customer adds a new disk, or disks, to a disk array). As noted above, prior art preparation processes are time-consuming processes. In the preparation process described and claimed herein, however, the preparation process takes substantially less time. For example, using the preparation process described and claimed herein, the disks in the medium-sized disk array described above may be prepared for use in less than 35 minutes, a greater than 15 times performance improvement.

FIG. 1 shows one exemplary process employing the faster process for preparing a disk for use in a disk array. The process begins at step 100, in which a range of sectors on a disk is defined. The defined range of sectors are those sectors that need to be prepared for use in the disk array. The defined range of sectors may include, among other things, all of the sectors on the disk, a contiguous group of sectors on the disk, or a selection of dis-contiguous sectors on the disk. For example, in a disk array configured as a Redundant Array of Independent Disks ("RAID"), disks may be partitioned into logical units. When preparing a disk for use in such a disk array, the defined range of sectors for the disk may be, for example, the sectors of the disk forming the disk's portion of the logical unit. The various RAID levels are discussed in more detail in the article "A Case for Redundant Arrays of Inexpensive Disks (RAID)," ACS SIGMOD Conference, Chicago, Ill., Jun. 1–3, 1988, by David A. Patterson, Garth A. Gibson and Randy H. Katz. A method for partitioning disk arrays into logical units is discussed in U.S. Pat. No. 5,568,629, issued Oct. 22, 1996, and titled "METHOD FOR PARTITIONING DISK DRIVE WITHIN A PHYSICAL DISK ARRAY AND SELECTIVELY ASSIGNING DISK DRIVE PARTITIONS INTO A LOGICAL DISK ARRAY," the disclosure of which is incorporated herein, in its entirety, by reference.

The process continues at step 110, in which the input/output control processor sends a command and a block of initial state data to the disk, instructing the disk to write the block of initial state data to the range of sectors on the disk. Next, at step 120, the disk writes the block of initial state data to each sector in the range of sectors on the disk, writing user data or redundancy information (in the block of initial state data) to the data area of the sector and writing metadata (in the block of initial state data) to the metadata area of the sector.

In general, user data is the data sent from the host processor to the disk array for storage on the disk array. Redundancy information, such as parity data, is used to recover user data in the event of a disk failure. As a result, redundancy information is typically stored on a disk different from the disk containing the user data. Metadata is "disk information" sent to the disk array from the input/output control processor. The input/output control processor uses metadata, as well as redundancy information, to manage the disk array and, thereby, improve the disk array's performance and reliability. Metadata may include, among other things, time stamp information, write stamp information, parity shedding information, and checksum information.

FIG. 2 shows another exemplary process employing the faster process for preparing a disk for use in a disk array. The process begins at step 200, in which a range of sectors on a disk is defined, similar to the process described at FIG. 1, step 100. Next, at step 210, the input/output control processor sends a command and a block of initial state data to the disk, instructing the disk to write the block of initial state data to a group of sectors on the disk. The group of sectors on the disk may be the same as the defined range of sectors on the disk or the group of sectors may be a subset of the defined range of sectors on the disk.

The process continues at step 220, in which the input/output control processor determines whether the block of initial state data has been written to all of the sectors within the defined range of sectors. If not, then at step 230, the input/output control processor determines the next group of sectors to be prepared. The methods for determining the next group of sectors are known to a person of skill in the art. For example, the input/output control processor might use an incrementing address. Next, the process returns to step 210, sending a command and a block of initial state data to the disk, instructing the disk to write the block of initial state data to the next group of sectors. The process ends when the block of initial state data has been written to all of the sectors within the defined range of sectors.

In an alternate embodiment of this exemplary process, the disk is allowed to perform other requests from the input/output control processor between write commands. For example, while the input/output control process determines whether the block of initial state data has been written to all of the sector within the defined range of sectors, or while the input/output control processor determines the next group of sectors, the disk might retrieve user data in response to a request from the host processor.

In a further embodiment of the exemplary processes described above, the disk may be marked with a signature. The signature signifies to the input/output control processor that all or part of the disk is prepared for use in a disk array. With the signature, a disk prepared for use in a disk array at one location, for example, a manufacturing facility, will not be "re-prepared" for use in a disk array at another location, for example, a customer site. Typically, the disk is marked with a signature after the block of initial state data has been written to all of the sectors in the defined range of sectors on the disk. The disk may also be marked with a signature after the block of initial state data has been written to a group of sectors on the disk. The signature may then be updated to reflect the progress of the preparation process.

In an alternate embodiment of the exemplary processes described above, multiple disks are prepared for use in the disk array at substantially the same time. In this embodiment, a range of sectors for each disk is defined and the input/output control processor sends a separate command and block of initial state data to each disk being prepared. Typically, the commands and blocks of initial state data are sent in parallel over the channel connecting the input/output control processor to the disks. Each disk then writes its initial state data to each sector in the defined range of sectors for the disk.

This alternate embodiment allows for a substantial range of flexibility in preparing disks for use in a disk array. For example, the block of initial state data for one disk may be different from the block of initial state data for another disk. Or, some disks in the disk array may be prepared using the process described in FIG. 2 (with or without the alternate embodiment), while other disks in the disk array may be prepared using the process described in FIG. 1. Or, all of the disks in the disk array may be prepared using the process described in FIG. 2 (with or without the alternate embodiment). This specific configuration is useful, for example, in preparing disks for use in a disk array configured as a RAID partitioned into logical units. For example, the defined range of sectors for each disk might be the disk's capacity and the group of sectors for each disk might be the sectors of the disk forming the disk's portion of the logical units. A person of skill in the art understands that the various combinations and permutations depend upon the specific implementation of the disk array and/or disks in the disk array.

In the preparation process described and claimed herein, a single command is sent from the input/output control processor over the channel to the disk. As noted, the command (e.g., the Small Computer System Interface Write Same command) instructs the disk to write a block of initial state data to each sector within a range of sectors, or a group of sectors, on the disk. The use of the preparation process, however, may require modification of the disk operating system. In particular, the use of the preparation process may require modification in the calculation of the metadata stored on a disk's sectors. The methods for modifying the calculation of metadata stored on a disk's sectors are known to a person of skill in the art.

For example, in general, a checksum verifies that user data is correct. In some disk operating systems, however, a checksum also verifies that the user data is located on the correct sector of the disk. Thus, in calculating checksum information, the checksum's location on the disk must be included in the calculation. In other words, each sector on the disk contains different initial state data for the checksum. Accordingly, without modification, the disk operating system may not be able to take full advantage of all aspects of the preparation process described and claimed herein.

In some operating systems, the time stamp, write stamp and parity shed stamp may also contain different initial state data for each sector on the disk. A time stamp and a write stamp are mechanisms for validating the sectors on a disk in a disk array. Time stamps and write stamps are discussed in more detail in U.S. Pat. No. 5,889,934, issued Mar. 30, 1999, and titled "DATA VALIDATION SYSTEM FOR A GROUP OF DATA STORAGE DISKS," the disclosure of which is incorporated herein, in its entirety, by reference. A shed stamp determines whether the parity for a number of sectors on a disk in a disk array is parity data or shed data. Shed data is used when one of the disks in the disk array is not operating. Shed data is discussed in more detail in U.S. Pat. No. 5,305,326, issued Apr. 19, 1994, and titled "HIGH AVAILABILITY DISK ARRAYS," the disclosure of which is incorporated herein, in its entirety, by reference.

In addition, the preparation process described and claimed herein is not dependent upon the length of the sectors on a disk, which vary in accordance with the application using the disk array. For example, in a typical small write application, the length of the sectors may be 512 bytes. In disk operating systems using metadata, however, the length of the sectors may be longer. For example, the length of a sector may be 520 bytes, in which 512 bytes may be reserved for user data or redundancy information (depending on whether the sector stored user data or redundancy information) and 8 bytes may be reserved for metadata. Of those 8 bytes, a checksum may be 16 bits (2 bytes) in length, a time stamp may be 16 bits (2 bytes) in length, a write stamp may be 16 bits (2 bytes) in length, and a shed stamp may be 16 bits (2 bytes) in length.

Also, the preparation process described and claimed herein is not dependent upon the data contained in the block of initial state data. For example, the block of initial state data may include a bit stream of zeros for writing to the data area of a sector and a bit stream of ones for writing to the metadata area of a sector. If the metadata area is divided into distinct areas, such as a checksum area and a time stamp area, then the block of initial state data may also include different bit streams for writing to the distinct metadata areas. For example, the block of initial state data may include a bit stream of zeros for writing to the data area of a sector, a bit stream of zeros and ones for writing to the checksum area of the metadata area and a bit stream of ones for writing to the time stamp area of the metadata area. A person of skill in the art understands that the various combinations and permutations for the block of initial state data depend upon the specific implementation of the disk array and/or disks in the disk array.

The various embodiments of the invention may be implemented in any conventional computer programming language. For example, the various embodiments may be implemented in a procedural programming language (for example, "C") or an object-oriented programming language (for example, "C++"). The various embodiments of the invention may also be implemented as preprogrammed hardware elements (for example, application specific integrated circuits or digital processors), or other related components.

The various embodiments of the invention may be also implemented as a computer program product for use with a computer system. Such implementation may include a series of computer instructions fixed either on a tangible medium, such as a computer readable media (for example, a diskette, CD-ROM, ROM, or fixed disk), or transmittable to a computer system via a modem or other interface device, such as a communications adapter connected to a network over a medium. The medium may be either a tangible medium (for example, optical or analog communications lines) or a medium implemented with wireless techniques (for example, microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (for example, shrink wrapped software), preloaded with a computer system (for example, on system ROM or fixed disk), or distributed from a server or electronic bulletin board over the network (for example, the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method for preparing a disk for use in a disk array, the disk array including an input/output control processor, the disk including sectors, the sectors including a data area and a metadata area, the method comprising:

defining a range of sectors to prepare for use in the disk array;

sending a first command to the disk from the input/output control processor, the first command instructing the disk to write a block of initial state data to each sector in a group of sectors on the disk, the group of sectors on the disk located within the defined range of sectors on the disk, the block of initial state data comprising a bit stream of data for writing to the data area and the metadata area of each sector; and writing the block of initial state data to each sector in the group of sectors on the disk.

2. The method according to claim 1 wherein the group of sectors on the disk is the same as the defined range of sectors on the disk.

3. The method according to claim 1, further comprising:

determining that the block of initial state data has not been written to all of the sectors within the defined range of sectors on the disk;

sending a second command to the disk to write the block of initial state data to at least one of unprepared sector within the defined range of sectors; and writing the block of initial state data to the at least one unprepared sector.

4. The method according to claim 3, further comprising:

allowing the disk to perform other requests from the input/output control processor prior to the process of sending the second command.

5. The method according to claim 1, further comprising:

marking the prepared disk with a signature, the signature signaling to the input/output control processor that the disk is prepared for use in a disk array.

6. The method according to claim 1 wherein the block of initial state data includes a bit stream of zeros for writing to the data area.

7. The method according to claim 1 wherein the metadata area includes a checksum area.

8. The method according to claim 7 wherein the block of initial state data includes a bit stream of zeros and ones for writing to the checksum area.

9. The method according to claim 1 wherein the metadata area includes a time stamp area.

10. The method according to claim 9 wherein the block of initial state data includes a bit stream of ones for writing to the time stamp area.

11. The method according to claim 1 wherein the metadata area includes a write stamp area.

12. The method according to claim 11 wherein the block of initial state data includes a bit stream of zeros for writing to the write stamp area.

13. The method according to claim 1 wherein the metadata area includes a shed stamp area.

14. The method according to claim 13 wherein the block of initial state data includes a bit stream of zeros for writing to the shed stamp area.

15. The method according to claim 1 wherein the sectors on the disk are 520 bytes in length.

16. The method according to claim 15 wherein the data of the sectors is 512 bytes in length and the metadata area of the sectors is 8 bytes in length.

17. The method according to claim 1 wherein the first command includes the a Small Computer System Interface Write Same command.

18. The method according to claim 1 wherein the disk array is a Redundant Array of Independent Disks.

19. The method according to claim 1 wherein the defined range of sectors includes all of the sectors on the disk.

20. A method for preparing more than one disk for use in a disk array, the disk array including an input/output control processor, the disks including sectors, the sectors including a data area and a metadata area, the method comprising:

defining for each disk a range of sectors to prepare for use in the disk array;

sending a first command to each of the disks from the input/output control processor, the first command instructing each disk to write a block of initial state data to each sector in a group of sectors on the disk, the group of sectors on each disk located within the defined range of sectors for the disk, the block of initial state data comprising a bit stream of data for writing to the data area and the metadata area of each sector; and writing the block of initial state data for each disk to each sector in the group of sectors on the disk.

21. The method according to claim 20 wherein the group of sectors on at least one disk is the same as the defined range of sectors on the at least one disk.

22. The method according to claim 20, further comprising:

determining that the block of initial state data has not been written to all of the sectors within the defined range of sectors on at least one disk;

sending a second command to the at least one disk to write the block of initial state data for the at least one disk to at least one unprepared sector in the defined range of sectors; and writing the block of initial state data to the at least one unprepared sector.

23. The method according to claim 22, further comprising:
allowing at least one disk to perform other requests from the input/output control processor prior to the process of sending the second command to the at least one disk.

24. The method according to claim 20, further comprising:
marking at least one of the prepared disks with a signature, the signature signaling to the input/output control processor that the at least one disk is prepared for use in a disk array.

25. The method according to claim 20 wherein the block of initial state data for each disk is the same block of initial state data.

26. The method according to claim 20 wherein the block of initial state data for at least one disk is different from the block of initial state data for the other disks.

27. The method according to claim 20 wherein the first command includes a Small Computer System Interface Write Same command.

28. The method according to claim 20 wherein the disk array is a Redundant Array of Independent Disks.

29. The method according to claim 20 wherein the defined range of sectors for at least one disk includes all of the sectors on the at least one disk.

30. A computer program product for preparing a disk for use in a disk array, the disk array including an input/output control processor, the disk including sectors, the sectors including a data area and a metadata area, the computer program product comprising a computer usable medium having computer readable program code thereon, the computer program code comprising:
program code for defining a range of sectors to prepare for use in the disk array;
program code for sending a first command to the disk from the input/output control processor, the first command instructing the disk to write a block of initial state data to each sector in a group of sectors on the disk, the group of sectors on the disk located within the defined range of sectors on the disk, the block of initial state data comprising a bit stream of data for writing to the data area and the metadata area of each sector; and
program code for writing the block of initial state data to each sector in the group of sectors on the disk.

31. The computer program product according to claim 30 wherein the group of sectors is the same as the defined range of sectors on the disk.

32. The computer program product according to claim 30, further comprising:
program code for determining that the block of initial state data has not been written to all of the sectors within the defined range of sectors on the disk;
program code for sending a second command to the disk to write the block of initial state data to at least one of unprepared sector within the defined range of sectors; and
program code for writing the block of initial state data to the at least one unprepared sector.

33. The computer program product according to claim 32, further comprising:
program code for allowing the disk to perform other requests from the input/output control processor prior to the process of sending the second command.

34. The computer program product according to claim 30, further comprising:
program code for marking the prepared disk with a signature, the signature signaling to the input/output control processor that the disk is prepared for use in a disk array.

35. A computer program product for preparing more than one disk for use in a disk array, the disk array including an input/output control processor, the disks including sectors, the sectors including a data area and a metadata area, the computer program product comprising a computer usable medium having computer readable program code thereon, the computer program code comprising:
program code for defining for each disk a range of sectors to prepare for use in the disk array;
program code for sending a first command to each of the disks from the input/output control processor, the first command instructing each disk to write a block of initial state data to each sector in a group of sectors on the disk, the group of sectors on each disk located within the defined range of sectors on the disk, the block of initial state data comprising a bit stream of data for writing to the data area and the metadata area of each sector; and
program code for writing the block of initial state data for each disk to each sector in the group of sectors on the disk.

36. The computer program product according to claim 35 wherein the group of sectors on at least one disk is the same as the defined range of sectors on the at least one disk.

37. The computer program product according to claim 35, further comprising:
program code for determining that the block of initial state data has not been written to all of the sectors within the defined range of sectors on at least one disk;
program code for sending a second command to the at least one disk to write the block of initial state data for the at least one disk to at least one unprepared sector in the defined range of sectors; and
program code for writing the block of initial state data to the at least one unprepared sector.

38. The computer program product according to claim 37, further comprising:
program code for allowing at least one disk to perform other requests from the input/output control processor prior to the process of sending the second command to the at least one disk.

39. The computer program product according to claim 35, further comprising:
program code for marking at least one of the prepared disks with a signature, the signature signaling to the input/output control processor that the disk is prepared for use in a disk array.

40. The computer program product according to claim 35 wherein the block of initial state data for each disk is the same block of initial state data.

41. The computer program product according to claim 35 wherein the block of initial state data for at least one disk is different from the block of initial state data for the other disks.

42. A computer system for preparing a disk for use in a disk array, the disk array including an input/output control processor, the disk including sectors, the sectors including a data area and a metadata area, the computer system comprising:
means for defining a range of sectors to prepare for use in the disk array;
means for sending a first command to the disk from the input/output control processor, the first command instructing the disk to write a block of initial state data to each sector in a group of sectors on the disk, the group of sectors on the disk located within the defined range of sectors on the disk, the block of initial state data comprising a bit stream of data for writing to the data area and the metadata area of each sector; and means for writing the block of initial state data to each sector in the group of sectors on the disk.

43. The computer system according to claim 42 wherein the group of sectors is the same as the defined range of sectors on the disk.

44. The computer system according to claim 42, further comprising:

means for determining that the block of initial state data has not been written to all of the sectors within the defined range of sectors on the disk;

means for sending a second command to the disk to write the block of initial state data to at least one of unprepared sector within the defined range of sectors; and means for writing the block of initial state data to the at least one unprepared sector.

45. The computer system according to claim 44, further comprising:

means for allowing the disk to perform other requests from the input/output control processor prior to the process of sending the second command.

46. The computer system according to claim 42, further comprising:

means for marking the prepared disk with a signature, the signature signaling to the input/output control processor that the disk is prepared for use in a disk array.

47. A computer system for preparing more than one disk for use in a disk array, the disk array including an input/output control processor, the disks including sectors, the sectors including a data area and a metadata area, the computer system comprising:

means for defining for each disk a range of sectors to prepare for use in the disk array;

means for sending a first command to each of the disks from the input/output control processor, the first command instructing each disk to write a block of initial state data to each sector in a group of sectors on the disk, the group of sectors on each disk located within the defined range of sectors on the disk, the block of initial state data comprising a bit stream of data for writing to the data area and the metadata area of each sector; and means for writing the block of initial state data for each disk to each sector in the group of sectors on the disk.

48. The computer system according to claim 47, further comprising:

means for marking at least one of the prepared disks with a signature, the signature signaling to the input/output control processor that the disk is prepared for use in a disk array.

49. The computer system according to claim 47 wherein the block of initial state data for each disk is the same block of initial state data.

50. The computer system according to claim 47 wherein the block of initial state data for at least one disk is different from the block of initial state data for the other disks.

* * * * *

UNITED STATES PATENT AND TRADEMARK OFFICE
CERTIFICATE OF CORRECTION

PATENT NO. : 6,584,544 B1
DATED : June 24, 2003
INVENTOR(S) : Steve Morley et al.

It is certified that error appears in the above-identified patent and that said Letters Patent is hereby corrected as shown below:

Column 8,
Line 34, delete "the"

Signed and Sealed this

Twelfth Day of August, 2003

JAMES E. ROGAN
*Director of the United States Patent and Trademark Office*